No. 820,822. PATENTED MAY 15, 1906.
B. W. PETERS.
GATE.
APPLICATION FILED MAR. 2, 1906.

WITNESSES: INVENTOR:
D. C. Walter  Bassett W. Peters,
Ada Law  F. Huron Hall, Atty.

UNITED STATES PATENT OFFICE.

BASSETT W. PETERS, OF TOLEDO, OHIO.

GATE.

No. 820,822.  Specification of Letters Patent.  Patented May 15, 1906.

Application filed March 2, 1906. Serial No. 303,755.

*To all whom it may concern:*

Be it known that I, BASSETT W. PETERS, a citizen of the United States, residing at Toledo, in the county of Lucas and State of Ohio, have invented certain new and useful Improvements in Gates; and I do declare the following to be a full, clear, and exact description of the invention, such as will enable others skilled in the art to which it appertains to make and use the same, reference being had to the accompanying drawings, and to the figures of reference marked thereon, which form a part of this specification.

A familiar objection to farm-gates as ordinarily constructed is that these gates after a time sag and drag on the ground and that they are at all times heavy and unwieldy.

My invention relates to and its object is to provide means for overcoming largely the difficulties here indicated and more particularly to furnish a gate of the class in which the gate both slides and swings, and to so construct such gate that it may be readily and conveniently adjusted vertically to compensate for the yielding of the gate-post or the sagging of the gate and for other purposes.

A further object of my invention is to so construct the gate and its supports that the gate shall at all times be centrally balanced upon a roller and so that the gate may be moved longitudinally to and fro with a minimum of force.

I attain these objects by means of the devices and arrangement of parts hereinafter referred to and shown, and illustrated in the accompanying drawings, in which—

Figure 1:
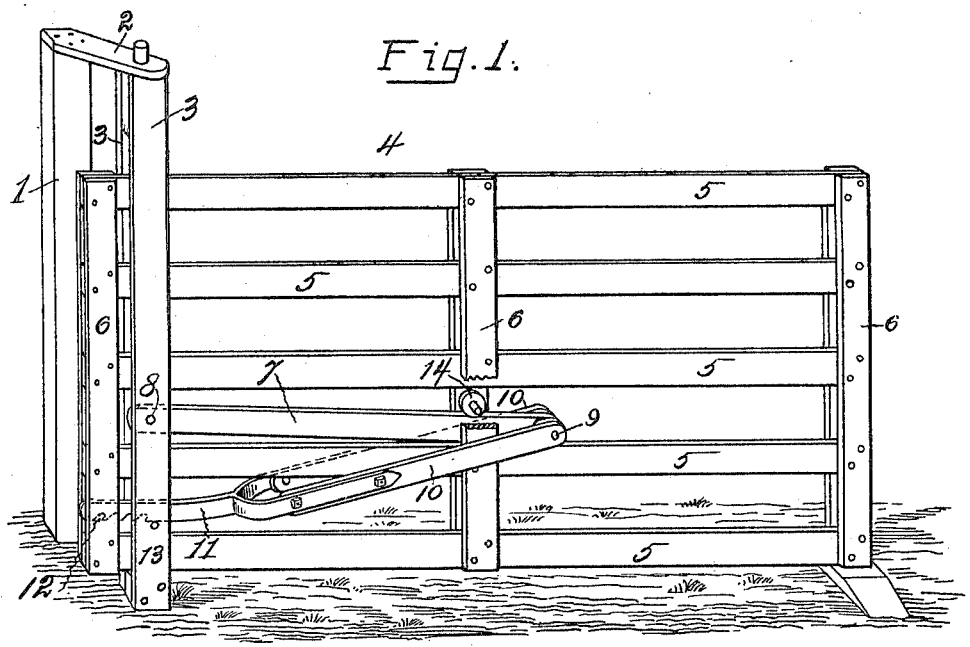
Figure 2:
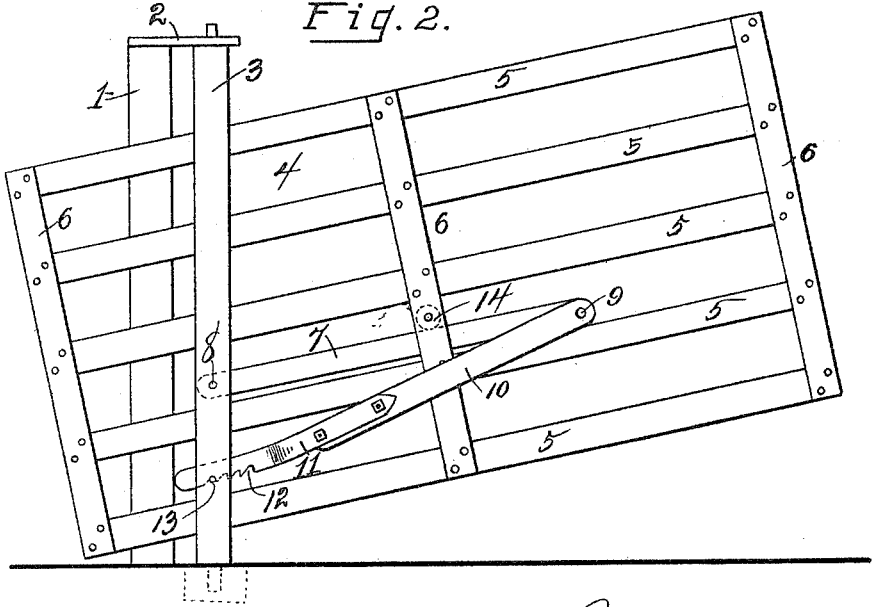

Figure 1 is a perspective view of my gate adjusted to rest at its outer end upon the ground and with a portion broken away to show the arrangement of the roller-bearing hereinafter referred to; and Fig. 2 is a side elevation of the same, showing the outer end of the gate elevated to avoid obstructions on the ground and to facilitate the separation of small stock, such as sheep and swine, from cattle.

Like numerals of reference indicate like parts in both figures.

In the drawings, 1 is a rigid upright gate-post having at top a horizontal arm 2. Between the arm 2 and the ground is pivotally supported a two-part upright post consisting of parallel bars 3 3. These bars are arranged far enough apart to permit the horizontal movement between them of the gate 4. This gate is composed of the usual parallel horizontal strips 5, secured between pairs of vertical strips 6 6.

7 is a horizontal bar pivoted, as at 8, between the pieces 3 below the middle horizontal strip 5 of the gate. To the opposite end of the piece 7 is pivoted, as at 9, a bifurcated bar 10, the two members of which are disposed at opposite sides of the gate. The two members of the bar 10 are united in a metal stem or bar 11, having a series of teeth on its under side, as at 12. The toothed bar 11 passes between the two upright members 3 and rests upon a pin 13, passing through the parts 3.

14 is a roller journaled between the central uprights 6 6 of the gate midway of the length of the gate. This roller rests and rides upon the top of the bar 7, the gate when in operative position being at all times balanced upon the roller 14.

The operation of my gate is as follows: The parts being assembled as described—the bar 7 being horizontally disposed and the brace 10 11 having its appropriate tooth 12 engaged with the pin 13—the gate is now balanced by means of the roller 14 upon the bar 7 and may be trundeled to and fro upon the bar a distance of about half the length of the gate. The gate may at any point in its longitudinal travel be swung upon its pivotal supports 3 3 into partly or wholly open position. It will be seen that the uprights 3, the bar 7, and the parts 10 and 11 form a triangle and that by means of the teeth on the bar 11 and the pivots 8 and 9 the bar 7 may be elevated to any desired angle to the horizontal, thus lifting and tilting with it the gate, which assumes the same angle as the bar 7. In this way the gate may be lifted upwardly, as shown in Fig. 2, or may be swung horizontally or may rest upon the ground, as shown in Fig. 1.

Some of the advantages of this construction, in addition to those already referred to, are that the gate may be mounted and operated upon a hillside. When the gate is closed, its weight may be rested upon the ground to relieve the post and the gate, and when it is desired to leave the gate in open position it may be dropped upon the ground, so that it may not be blown about on its pivot. Another advantage is that by lifting the free end of the gate the teeth of the brace 11 will drop successively and automatically upon the pin 13 and will hold the gate in any position to which it may be lifted.

Having described my invention, what I claim, and desire to secure by Letters Patent, is—

A gate-post pivoted at top and at bottom, a bar pivoted at one end upon said post, a brace pivotally connected at its upper end with the other end of said bar, a series of teeth on the under side of the lower end of said brace, a pin upon said post adapted to engage either of the teeth upon said brace, a gate, and a roller upon said gate journaled midway of the length of the gate and adapted and arranged to travel upon the top of said bar.

In testimony whereof I affix my signature in presence of two witnesses.

BASSETT W. PETERS.

Witnesses:
L. SKRANSEWFKY,
ADA LAW.